3,684,640
INSULATING SUBSTRATE FOR HIGH-FREQUENCY WELDING
Theo Hillers, Troisdorf, Germany, assignor to Dynamit Nobel AG, Troisdorf, Germany
Continuation-in-part of application Ser. No. 43,724, June 5, 1970. This application Jan. 4, 1971, Ser. No. 103,446
Claims priority, application Germany, June 6, 1969, P 19 28 662.5; Jan. 2, 1970, P 20 00 139.2
Int. Cl. B32b 3/10, 3/30, 5/18
U.S. Cl. 161—114      4 Claims

ABSTRACT OF THE DISCLOSURE

A composite article formed by high frequency welding of synthetic resins is formed by the use of an insulating material which comprises the substrate for the high frequency welding of a synthetic resin, such as polyvinyl chloride foam, to the sieve-like perforated material, such as various textile materials, nettle cloth, tricot or perforated synthetic resin films. The insulating substrate is provided with a plurality of relatively small protuberances and/or indentations on the side which faces the material to be welded, resulting in an excellent welding bond.

---

This application is a continuation-in-part of copending application Ser. No. 43,724, filed on June 5, 1970.

The parent application Ser. No. 43,724 relates to a composite article and a process for preparing the same by the high frequency welding of a synthetic resin foam, such as polyvinyl chloride, with sieve-like perforated materials, such as tricot, nettle cloth, perforated films and foils and the like. In the process described therein, at least the electrode disposed on the side of the sieve-like perforated material is provided with an insulating layer. The insulating layer is provided, on the side facing the material to be welded, with numerous, relatively small protuberances or nubs and/or indentations or depressions, so that the synthetic resin foam, particularly polyvinyl chloride, which is heated by the high frequency current during the welding process and thereby placed into a plastic state, penetrates through the sieve-like perforated material into and between the protuberances or indentations and is mechanically anchored to the fabric after cooling. The disclosure of the parent application is incorporated herein by reference.

The present invention relates to an insulating substrate as mentioned in said copending parent application for the high frequency welding of synthetic resin foams, especially polyvinyl chloride foams, or of foams, fleeces or wadding (cotton wool) saturated with polyvinyl chloride or a copolymer thereof, to sieve-like perforated materials, such as tricot, nettle, textile materials, perforated plastic films, and the like. In accordance with this invention, the insulating substrate is provided, on its side facing the material to be welded, with numerous, relatively small protuberances and/or indentations, which can be termed generically as a plurality of undulations.

In a suitable practical embodiment of the invention, the side of the insulating substrate facing the material to be welded is provided with a wire mesh structure. In lieu thereof, this side can be provided with blind holes or, in another alternative of the invention, with grooves. The present invention is also effective, in another preferred embodiment thereof, if the substrate of insulating material is fashioned as an insulating layer in the form of a lattice fabric.

Accordingly, one of the objects of the present invention is to provide articles of synthetic resin foams which are welded to sieve-like perforated materials.

Another object of the invention is to provide an insulating substrate for the high frequency welding of plastic foams, such as polyvinyl chloride, to sieve-like perforated materials, such as tricot, nettle cloth, textile materials, perforated plastic films and the like.

These and other objects and advantages of the present invention will become apparent to those skilled in the art from a consideration of the following specification and claims, taken in conjunction with the accompanying drawing wherein:

Figure 1:
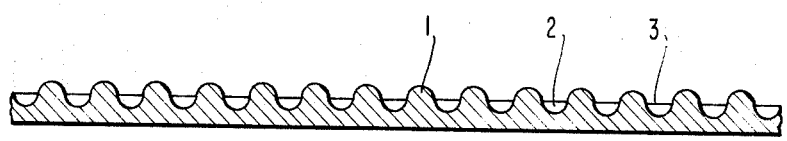
FIG. 1 is a cross-sectional view of an insulating substrate formed with a wire mesh structure.

According to FIG. 1, the substrate of insulating material is provided with the protuberances or nubs 1 and the indentations 2, respectively. As illustrated therein, these protuberances or indentations can be lowered or raised, respectively, to the median level 3 in the direction of view. However, instead, the protuberances 1 can also be lowered, in the direction of sight, to the bottom of the indentations 2, or the indentations 2 can be raised to the level of the protuberances 1. It is also possible to select any desired intermediate values in one manner or another.

Figure 2:
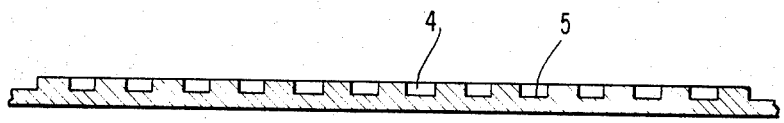
FIG. 2 shows, in a corresponding manner, an insulating substrate provided with blind holes.

In accordance with FIG. 2, the insulating substrate is provided on one side with the blind holes 4, the latter having, of course, any desired cross-sectional shape. The blind holes 4 need not be fashioned with the planar bottom 4, as shown, but can have, as seen in a longitudinal sectional view, any other desired configuration.

Figure 3:
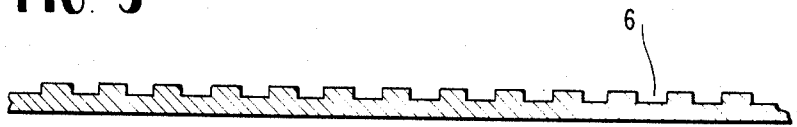
FIG. 3 shows an insulating substrate provided with grooves.

In FIG. 3, the insulating substrate is provided on one of its sides with the grooves 6. The latter can extend either only in the viewing direction, webs thus being formed between the groovs 6. However, it is also possible for the grooves to extend additionally transversely thereto (i.e., diagonally, obliquely, at right angles, askancely, athwartly, askewly, crosswisely, slantingly, etc.), thereby forming quadrilateral, rectangular or square step-like elevations.

Figure 4:
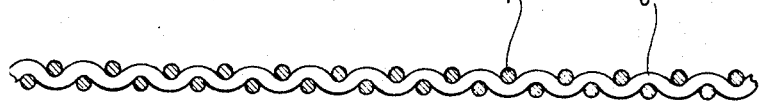
FIG. 4 shows an insulating layer fashioned as a lattice fabric.

According to FIG. 4, the insulating substrate is formed as a lattice fabric with threads or wires 7 and 8 extending vertically with respect to each other in the manner of warp and weft.

In each case, the size of the protuberances or indentations, the blind holes, the grooves or the mesh width is adapted in one dimension as well as in the other (i.e., in both width and length) as regards to the respective requirements.

Although polyvinyl chloride constitutes the preferred synthetic resin foam material employed in accordance with this invention, it is to be understod that the invention is equally applicable to all synthetic resins which can be welded together in a high-frequency field, but which do not enter into a homogeneous bond with the fabric to be welded. Thus, in addition to PVC, it is also possible to use copolymers of vinyl chloride, such as copolymers of vinyl chloride and vinyl acetate, as well as materials which have properties similar to PVC, such as, for example, polyvinyl acetate. It is also possible to use foams of polyamides, for example, in the present invention.

Materials used as the insulating substrate in the present invention include, among others, phenolic resin-cellulose laminated paper, silicone glass cloths, rubber cloth compounds, films of various rubbers, polytetrafluoroethylene glass fabrics, polyterephthalates, cellulose acetates, oiled linen (oil cloth) and varnished linen, silicone films, polyethylene and polypropylene films, oil-impregnated papers and glassine, epoxy resins and other thermosetting synthetic plastics, glass compounds, asbestos compounds, mica compounds and spreadable insulating films. These materials have good properties with respect to their breakdown resistance (under high frequencies), temperature stability, dielectric strength and mechanical characteristics. The important point of this invention is, however, the structural characteristics of the insulating substrate, as described above.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A composite article comprising a synthetic resin foam, an insulating substrate, and a sieve-like perforated material disposed therebetween, said insulating substrate being provided on the side facing the perforated material with a plurality of undulations whereby the synthetic resin foam extends through the sieve-like material in and around said undulations and is the thereby mechanically anchored to said perforated material, the undulations on said substrate being provided by a wire mesh structure positioned on the side of the substrate facing the material to be welded.

2. A composite article comprising a synthetic resin foam, an insulating substate, and a sieve-like perforated material disposed therebetween, said insulating substrate being provided on the side facing the perforated material with a plurality of undulations whereby the synthetic resin foam extends through the sieve-like material in and around said undulations and is thereby mechanically anchored to said perforated material, the undulations on said substrate being provided by a plurality of blind uniformly spaced holes on the side of the substrate facing the material to be welded.

3. A composite article comprising a synthetic resin foam, an insulating substrate, and a sieve-like perforated material disposed therebetween, said insulating substrate being provided on the side facing the perforated material with a plurality of undulations whereby the synthetic resin foam extends through the sieve-like material in and around said undulations and is thereby mechanically anchored to said perforated material, the undulations on said substrate being provided by a plurality of grooves extending in the longitudinal direction on the side of the substrate facing the material to be welded.

4. A composite article comprising a synthetic resin foam, an insulating substrate, and a sieve-like perforated material disposed therebetween, said insulating substrate being provided on the side facing the perforated material with a plurality of undulations whereby the synthetic resin foam extends through the sieve-like material in and around said undulations and is thereby mechanically anchored to said perforated material, the undulations on said substrate being provided by a plurality of grooves extending in an transverse direction on the side of the substrate facing the material to be welded.

References Cited

UNITED STATES PATENTS

| | | | |
|---|---|---|---|
| 2,922,865 | 1/1960 | Schattler et al. | 156—380 XR |
| 3,400,040 | 9/1968 | Osgood | 156—273 XR |
| 3,466,214 | 9/1969 | Polk et al. | 156—380 XR |

WILLIAM A. POWELL, Primary Examiner

U.S. Cl. X.R.

156—273, 380; 161—94, 123, 159